Patented May 10, 1949

2,470,020

UNITED STATES PATENT OFFICE 2,470,020

QUICK FROZEN HOMOGENIZED MILK

Frank L. Crowley, Binghamton, N. Y., assignor to Crowley's Milk Company, Inc., Binghamton, N. Y., a corporation of New York No Drawing. Application April 24, 1946,
Serial No. 664,696

1 Claim. (Cl. 99—192)

This invention relates to providing a fresh milk product which can be kept over comparatively indefinite long periods of time and more particularly to the prevention of permanent changes in the physical equilibrium of reconstituted fresh milk after storage over prolonged periods of time.

The usual procedure for storing milk is by condensing and canning with resultant caramelization or by reducing it to a powdered form in which state it is packaged and kept for subsequent use. In the first instance mentioned above, the unsuitable taste of canned milk as a drinking medium is well known and likewise is it known that powdered milk normally reconstituted, or nearly so, by the addition of water makes the liquid a tasteless and unpalatable drinking medium.

Further, an indicated method or process for keeping milk over its normal period of keeping is by pasteurizing it, reducing its volume, and subsequently freezing the pasteurized product. However, it has been discovered that this process likewise results in an unsatisfactory product in that, when kept over a period of time, the constituents of the milk particularly the watery constituent separates out when the product is unfrozen and when reconstituted as fresh milk is unsatisfactory as to taste and appearance. That is, fresh milk which may be pasteurized and concentrated or unevaporated and frozen, if allowed to stand for from 60 to 90 days produces a permanent separation of the fats and solids in that the reconstituted milk appears to have a flaky character which will not go into solution upon the addition of water.

In any event, the satisfactory preservation of sweet fresh milk over periods of 60 days and longer, so as to improve and retain its flavor and natural color as a reconstituted product for drinking and other purposes is unknown except for this discovery.

The advantages in improving the keeping qualities of sweet fresh milk in the whole state as well as improving its flavor will be readily recognized and accordingly it is an object of this invention to provide an improved milk product capable of storage for long periods of time and being reconstituted back to normal milk.

It is a further object of this invention to provide improvements in the processing of a sweet milk product enabling it to be frozen for indefinite long periods of time and eventually restored to its original natural flavor for drinking and other purposes.

An additional object of this invention is to provide an improved method and processing for sweet milk which is capable of being stored in the frozen state and eventually restored to an improved natural flavor and appearance.

Other objects, advantages, improvements, uses, and modifications will be apparent from the following description and illustrations.

In the hereinafter described processing of fresh milk for freezing and storage it is illustrated and discovered that it is not alone a sterilization and concentration of the milk protein which aids in its preservation but that additional treatment is necessary. In this additional treatment the fat is broken up into fine particles so that it never again separates from the rest of the fluid and remains in suspension, to leave as an end product a fluid of uniform consistency.

In order to illustrate the improved milk product herein provided and which may be kept in the pure sweet state for as much as six months to two years or longer, I take sweet whole milk and clarify it in a commercial clarifying machine of standard design. This machine removes sediments and foreign substances which may have gotten into the milk. After clarifying the milk it is run through a homogenizer of standard design to break up the fat into fine particles and evenly distribute them throughout the liquid giving it a uniform consistency.

The treatments provided above have a tendency to introduce air into the milk and so to remove the air as well as to provide for further processing the balance of the treatment is preferably carried out under vacuum. In this stage the cold milk is placed in evaporating or concentrating pans under a vacuum of 25 inches until all the air is removed. This de-aerating process usually requires for a pan of 3500 quarts capacity from two and one-half to three hours and is normally carried out in pan batches. Thereafter, the milk is warmed in the same pan to a temperature of 120° F. to concentrate it preferably to about one-third its normal volume. However, in some instances where the normal volume or other volumes are desirable for packaging this concentrating step may be eliminated or controlled to the degree of concentration desired.

During the de-aerating and concentrating steps a large quantity of the naturally occurring ascorbic acid is removed. The removal of this acid is further aided and completed during the pasteurizing which may be performed as the next step in the process by heating the pans of milk to 165° F. to 185° F. for a period of thirty minutes, preferably keeping them under the vacuum as heretofore mentioned. In some instances ascorbic acid of the milk may be completely removed by subjecting it to ultra-violet rays for a period of thirty minutes per 1000 quarts.

Further, inasmuch as the removal of ascorbic acid is an important feature in preparing milk for storage and ultra-violet rays are useful for this purpose, a combination of the heat treatment and light treatment may be accomplished, for example, during the pasteurizing stage.

In the processing described above for de-aerating, concentrating, homogenizing, and pasteurizing milk an alternative method for some of these steps may be used, whereby the homogenized milk may be sprayed from the homogenizer directly into "hot-pans" or a heated chamber which may or may not be under a slight vacuum. Spraying of the homogenized milk into the heated chamber or "hot-pans" removes a portion of the water content, foreign flavors, ascorbic acid, and pasteurizes the milk in the same operation, when held at pasteurizing temperatures.

For almost immediate use or where the clarified, de-aerated, homogenized and pasteurized milk is to be packaged in the whole form, the process of concentrating may be eliminated. However, in any case where the milk is pasteurized at temperatures of from 165° F. to 185° F. it is run into metal containers while maintained at pasteurizing temperature under approximately 25 inches vacuum. A slight head space is left in the container, for purposes of expansion, and it is immediately sealed and cooled to approximately 60° F., whereupon the vacuum packed container is subjected to a fast freezing temperature on the order of 20° below zero. Thereafter, containers filled with milk treated in the manner herein described are maintained in a frozen state until ready for use or they may be placed in cold storage, after thawing, at normal temperatures of 30° F. to 40° F. above zero for from 30 to 90 days or longer before use. Particularly has it been discovered that concentrated milk so handled can be reconstituted back to sweet milk to be used for drinking purposes with a flavor more pleasing than fresh milk.

In the process of packaging milk of the character as treated herein in paper containers, it is preferably cooled to a temperature of 60° F., after pasteurization, before it is run into the containers likewise under vacuum of approximately 25 inches. Whereafter, in the event the milk is to be stored, the filled containers are immediately placed in a freezing temperature on the order of 20° below zero. As indicated in the hot packaging of milk in metal containers, care must be taken to have a slight head space in the paper containers to allow for expansion of the milk during its freezing stage.

In the above described process for treating and storing milk, it has been discovered after freezing for a period of from six months to two years, thawing and reconstituting the milk by addition of water to bring it back to its normal volume it has a sweeter flavor in addition to its natural taste and appearance. This improved quality of fresh milk which has been frozen and stored over a long period of time is believed due to the product being pure and bacteria action at a minimum with the natural sugar content improved by removal of ascorbic acid and foreign flavors which tend to absorb and mask the natural sweetness of the milk. In addition, by the special treatment provided, the natural solubility of the milk is preserved as it does not flake-out or have its equilibrium disturbed except insofar as occurs from homogenizing during processing.

While I have described above a specific order of procedure for obtaining and preserving an improved milk product of unexpected and heretofore unknown keeping characteristics it is to be understood that the order of such treatment may be varied in accordance with the arrangement of the standard equipment involved and the desires of the operator. For example, the homogenizing of the milk may be accomplished after pasteurizing and condensation takes place in order to keep the milk from thickening too much before the final step of packaging occurs under vacuum as heretofore described.

It will be obvious to those skilled in the art that various changes may be made in the invention without departing from the spirit and scope thereof and therefore the invention is not limited by that which is described and illustrated in the specification but only as indicated in the appended claim.

What is claimed is:

A process for treating and packaging sweet fresh milk comprising the steps of clarifying the milk at normal temperature to remove impurities, homogenizing the clarified milk, de-aerating the homogenized milk at normal temperature under vacuum, heating the de-aerated milk to a temperature of approximately 120° F., concentrating the heated de-aerated milk at a temperature of approximately 120° F., pasteurizing the milk for thirty minutes at a temperature between 165° F. and 185° F., packaging and sealing the pasteurized milk under vacuum at a temperature between 165° and 185° F., creating a self-contained vacuum in each package by cooling to a temperature of approximately 60° F., and quick freezing the packaged milk at a temperature on the order of 20° below zero.

FRANK L. CROWLEY.

REFERENCES CITED

The following references are of record in the file of this patent:

UNITED STATES PATENTS

| Number | Name | Date |
|---|---|---|
| 1,964,279 | Webb | June 26, 1934 |
| 2,199,816 | Flosdorf | May 7, 1940 |
| 2,412,203 | Brunkhurst | Dec. 10, 1946 |

OTHER REFERENCES

Journal of Dairy Science, vol. XXI, 1938, pages 109 to 118.

Journal of Dairy Science, vol. XXIII, 1940, pages 919 to 928.

Scientific American, April 1941, page 224.

"Food Industries," Jan. 1939, pages 10, 11, and 54, article by J. M. Roush.